(12) United States Patent
Hsieh

(10) Patent No.: US 6,272,210 B1
(45) Date of Patent: Aug. 7, 2001

(54) COMMUNICATION SYSTEM BETWEEN LOCAL AREA NETWORK STATIONS

(76) Inventor: Mingchih Hsieh, 1004 Stewart Dr., Sunnyvale, CA (US) 94086

( * ) Notice: Subject to any disclaimer, the term of this patent is extended or adjusted under 35 U.S.C. 154(b) by 0 days.

(21) Appl. No.: 09/298,938

(22) Filed: Apr. 24, 1999

(51) Int. Cl.[7] .................................................. H04M 11/00
(52) U.S. Cl. .................................... 379/93.07; 379/93.05; 379/93.09; 379/171
(58) Field of Search ............................. 379/93.07, 93.05, 379/93.09, 93.28, 93.36, 21, 36, 167, 170, 171, 172, 173, 169, 177

(56) References Cited

U.S. PATENT DOCUMENTS

| | | | |
|---|---|---|---|
| 5,090,052 | * 2/1992 | Nakajima et al. | 379/172 |
| 5,506,891 | 4/1996 | Brown | 379/97 |
| 5,610,920 | 3/1997 | Doll et al. | 370/389 |
| 5,699,413 | 12/1997 | Sridhar | 379/98 |

FOREIGN PATENT DOCUMENTS

408032652A * 2/1996 (JP) .................................. H04M/1/00
410215322A * 8/1998 (JP) .................................. H04M/3/42

* cited by examiner

*Primary Examiner*—Curtis Kuntz
*Assistant Examiner*—Melur Ramakrishnaiah
(74) *Attorney, Agent, or Firm*—Robert Samuel Smith

(57) ABSTRACT

A circuit for permitting communication between stations of a local area network connected to a central office wherein interference such as the dial tone from the central office is eliminated during station to station communication. The modem of a first station has a data processor which analyzes a number dialed at the first station. When the number is intended for a second station who is a network member, the central station is disconnected from the first station and line current is supplied by a current generator local to the first station. The signal is transmitted from the first to the second station by capacitive coupling. A telephone pickup is made at the second station and when the incoming call is from the first station, then line current to the second station is received from a current generator local to the second station and not from the central station thereby eliminating dial tone.

6 Claims, 16 Drawing Sheets

COMMUNICATION SYSTEM BETWEEN LOCAL AREA NETWORK STATIONS

BACKGROUND AND INFORMATION DISCLOSURE

The typical work station in a home or business includes a phone, a fax modem, and a computer, all connected to one another and to the central office. FIG. 1 is a block diagram of the typical work station according to the prior art including a computer 12 connected to a modem 11. The modem 11 includes an interface 14 between the computer 12 and a controller 16. The modem 11 also has a data processor 18 which communicates with speaker 20, microphone 22, telephone 24 under control of controller 16 according to the program stored in memory 26. The modem 11 also includes a current generator 28 for operating the speaker 20 and microphone 22. The modem 11 is connected to the central telephone office 30 through the DAA (data access aitangement). The circuitry of the sections shown in FIG. 1 is well known to those having ordinary skill in the art.

U.S. Pat. No. 5,506,891 to Brown discloses a method and apparatus for detecting the connection status of an extension phone connected to a voice/fax modem. Off hook condition is indicated by a comparison of an average line voltage to an instantaneous voltage. The modem responds to the detection of off-hook extension line by deactivating a voice answering machine cycle.

U.S. Pat. No. 5,610,920 discloses coupling of voice and computer resources over LAN networks.

U.S. Pat. No. 5,699,413 discloses a system for ;simultaneously enabling a voice and data session by detecting differences in the sessions and directing each session to an appropriate channel.

None of these disclosure consider problems of communication between two members of a local area network (LAN) that are addressed by the present invention.

In both homes and in business offices, more than one work station is being installed at separate location in the home or office. The locations of these stations are ideally separate from one another, in separate rooms and even on separate floors, or even separate buildings. For example, in a home, one work station may be in an upstairs bedroom and a second work station may be in the garage. In order for one party to communicate with a second party, he either has to interrupt his work and go to the other site, or he has to shout to the other party to pick up the phone. When the first party does succeed in alerting the other party to pick up the phone, the dial tone is present on the line which is, at best, an annoyance to both parties.

SUMMARY OF THE INVENTION

It is an object of this invention to facilitate communication in a local network wherein the local network can be a network of telephone extensions or computer stations.

It is a further object to provide a system with which one party (sender) can notify another party (target) that he is attempting to communicate. It is another object to enable the sender and target to communicate m ore clearly by eliminating dial t one.

This invention is directed toward a circuit which, in combination with the modem of the originating station, supplies line current to both the originating station and the target station thereby supplanting current from the central station. The dial tone is thereby eliminated when the two stations a recommunicating directly with one another.

This invention is directed toward a system whereby an audio alert signal from a sending station to a target station is generated by a user at the sending station dialing the number of the target station. The alert signal notifies a user at the target station that a user at the sending station is attempting to communicate. The dialing action causes the modem at the sending station to cutoff the line current from the central station and substitute line current from the modem to the sending station. When the user at the target station answers by picking up the target telephone, the modem at the target phone cuts off current to the target station.

Cutting off the current from the central station eliminates the dial tone to both sender and target.

The system is applicable to any device having a built in modem with play back capability.

DESCRIPTION OF BEST MODES

Figure 1:
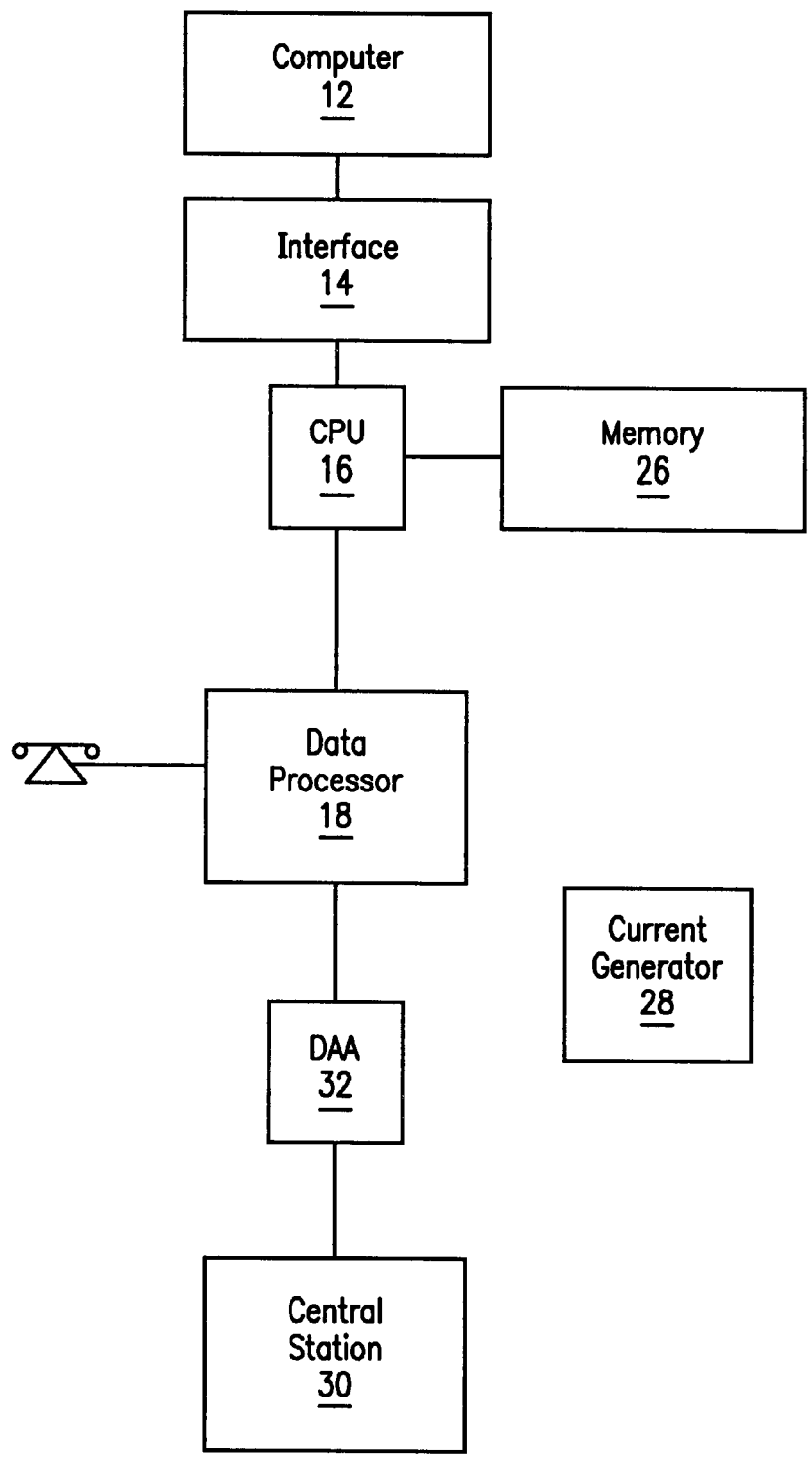
FIG. 1 shows a work station of the prior art including a modem.
Figure 2:
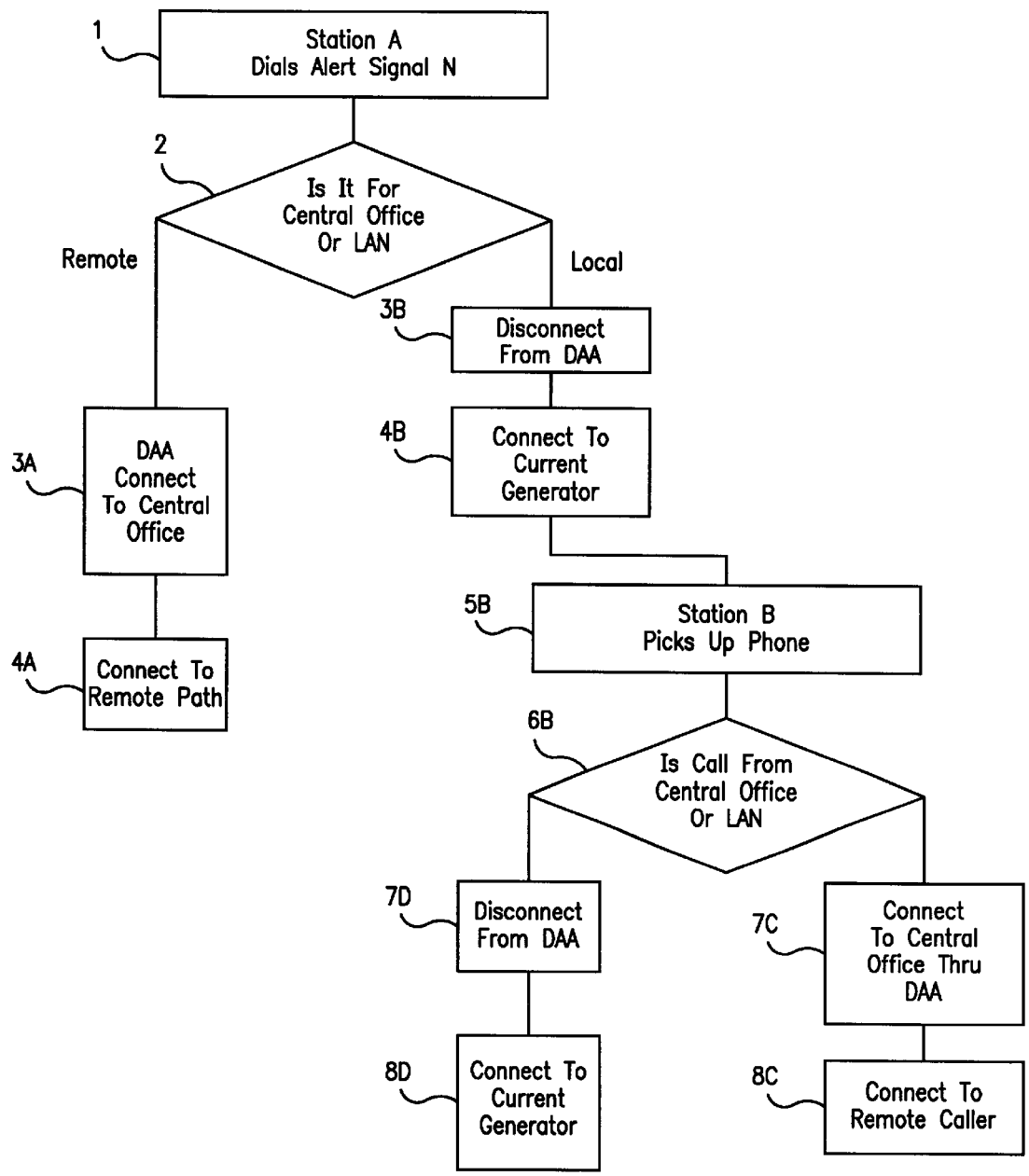
FIG. 2 shows a flow chart illustrating the method of the invention.

Turning now to a discussion of the drawings. FIG. 2 shows a flow chart of steps for practicing the method of this invention involving communication between station A and station B of a local area network (LAN).

In step 1, station A dials a call number, N.

In step 2, a controller examines N. If N is for a remote party, then proceed to step 3A. If N is for station B, proceed to step 3B Step 3A, connect through the DAA of station A to to draw current from the central office and transmit signal directly to the central office .

Step 4A. connect station A through central office to remote party.

Step 3B: disconnect central office from DAA of station A thereby interrupting line current from central office to station A, interrupting the dial tone Step 4B connect current generator of modem of station A thereby supplying current from the current generator to the data processing unit of station A sending N signal from station A to station B by capacitive coupling between the data processors of stations A and B.

Step 5B: station B receives a signal and responds by picking up the telephone.

Step 6B If caller to station B is a remote caller; proceed to step 7C. If caller to station B is from station A, then proceed to step 7D.

Step 7C Connect to central office through DAA of station B

8C Connect to remote caller through central office.

Step 7D Disconnect DAA of station B thereby interrupting line current to station B from the central office.

Step 8D Connect current generator of modem of station B in place of disconnected DAA of station B so that current to station B is provided by the current generator, and communication between station A and station B can take place without dial tone.

Figure 3:
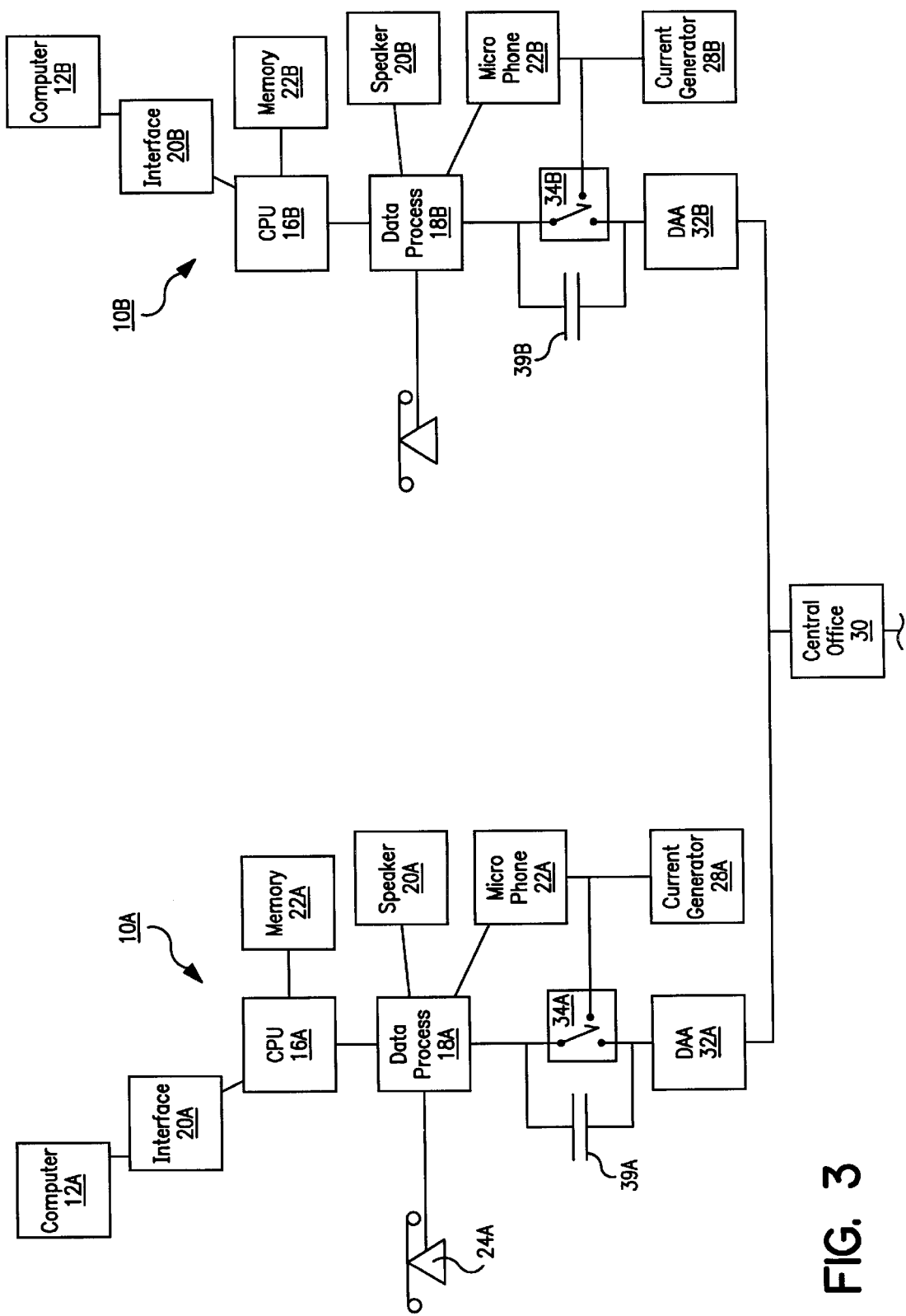
FIG. 3 shows a LAN of two work stations according to the invention.

FIG. 3 shows a schematic block diagram of the invention applied to a LAN of station A and station B. Each station A,B has a computer 12A,B and a modem 10A,B which includes an interface 20 A,B between the computer 12 A,B and a controller 16 A,B. The modem 10 A,B also has a data processor 18 A,B which communicates with speaker 20 A,B, microphone 22 A,B telephone 24 A,B under control of controller 16 A,B according to the program stored in memory 22 A,B. The modem 10 A,B also includes a current generator 28 A,B for operating the speaker 26A,B and microphone 22A,B and a DAA 32 A,B for detecting a ring signal from the central station 30 and admitting line current from the central station 30 to the modem 10 A,B. In addition, each modem 10 A,B has a switch 34A,B which provides line current to the respective modem to operate the respective telephone when the station A is calling station B. Disconnecting the DAA 32A from its modem 10A by dialing the number of station B from telephone 14A eliminates the dial tone in telephone 24A when telephone 24 A is off hook. When telephone 14B is picked up in response to the dialed signal from telephone 14A, memory 22B is programmed to position switch 34B to disconnect DAA 32B thereby interrupting line current from the central station and providing line current from current generator 28B to the speaker 20B, microphone 22B and telephone 24B of station B. Cutting off DAA 32B eliminates the dial tone to telephone 24B. The signal between modem A and modem B is transmitted by capacitive coupling provided by capacitors 39A,B which are connected across switches 34 A,B respectively.

Figure 4A:
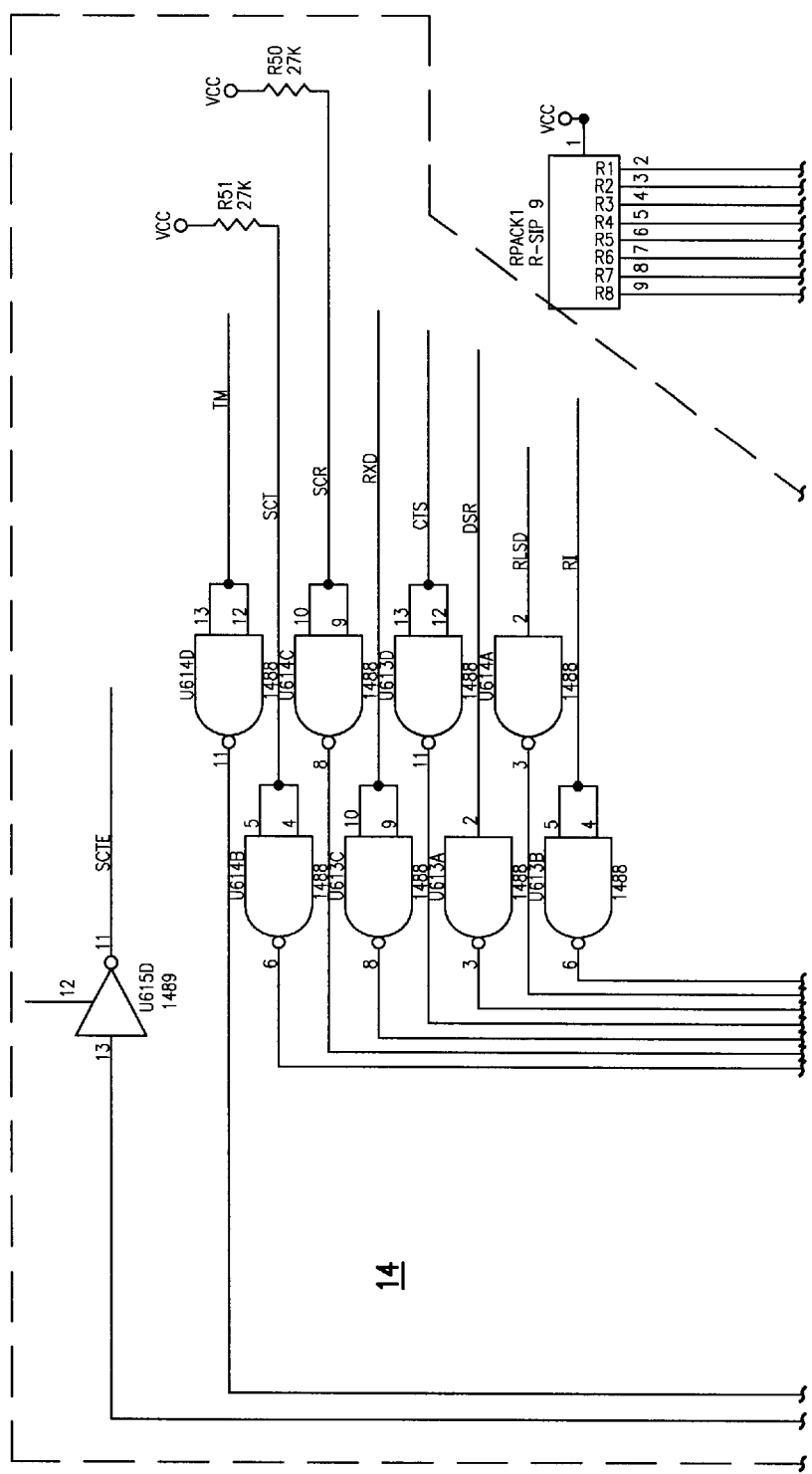
FIG. 4 shows details of the interface 14 between the computer 12 and modem 10 A,B/Also shown is a stand alone LED display 15 and power source 17.
Figure 4B:
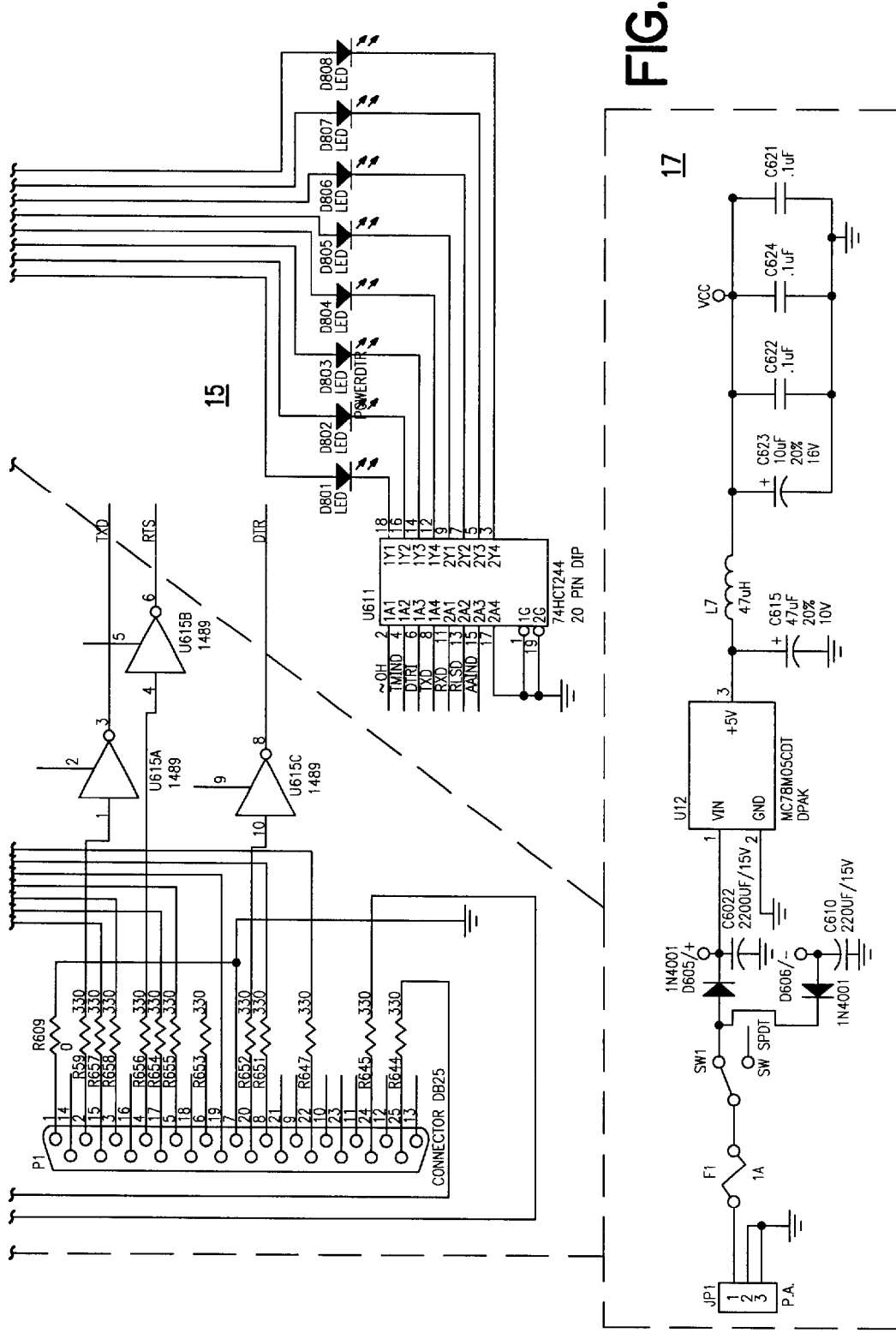
Figure 5A:
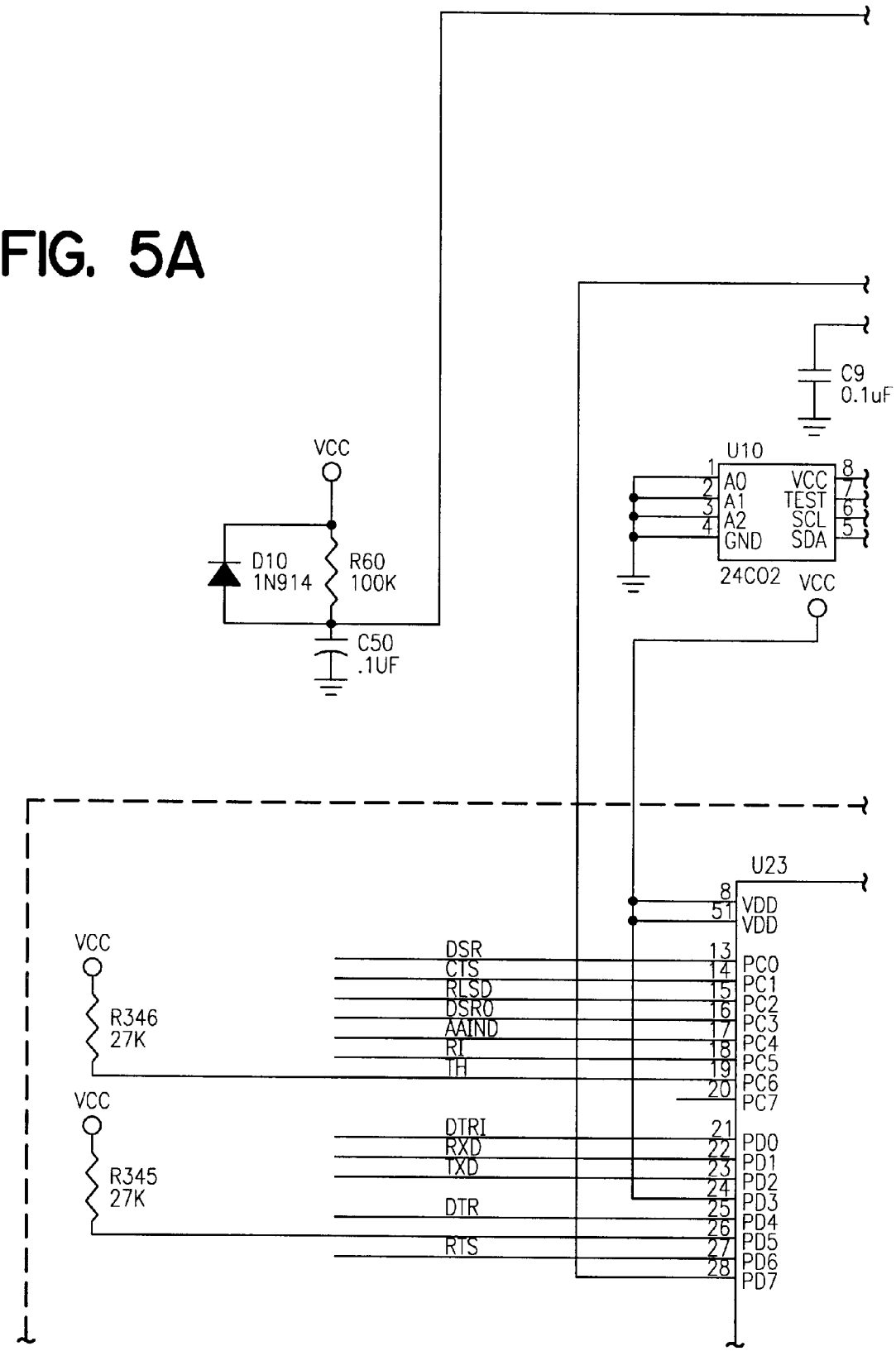
FIG. 5 shows the controller 16 with memory 26 and the data processor 18 of the modem 10 of this invention.
Figure 5B:
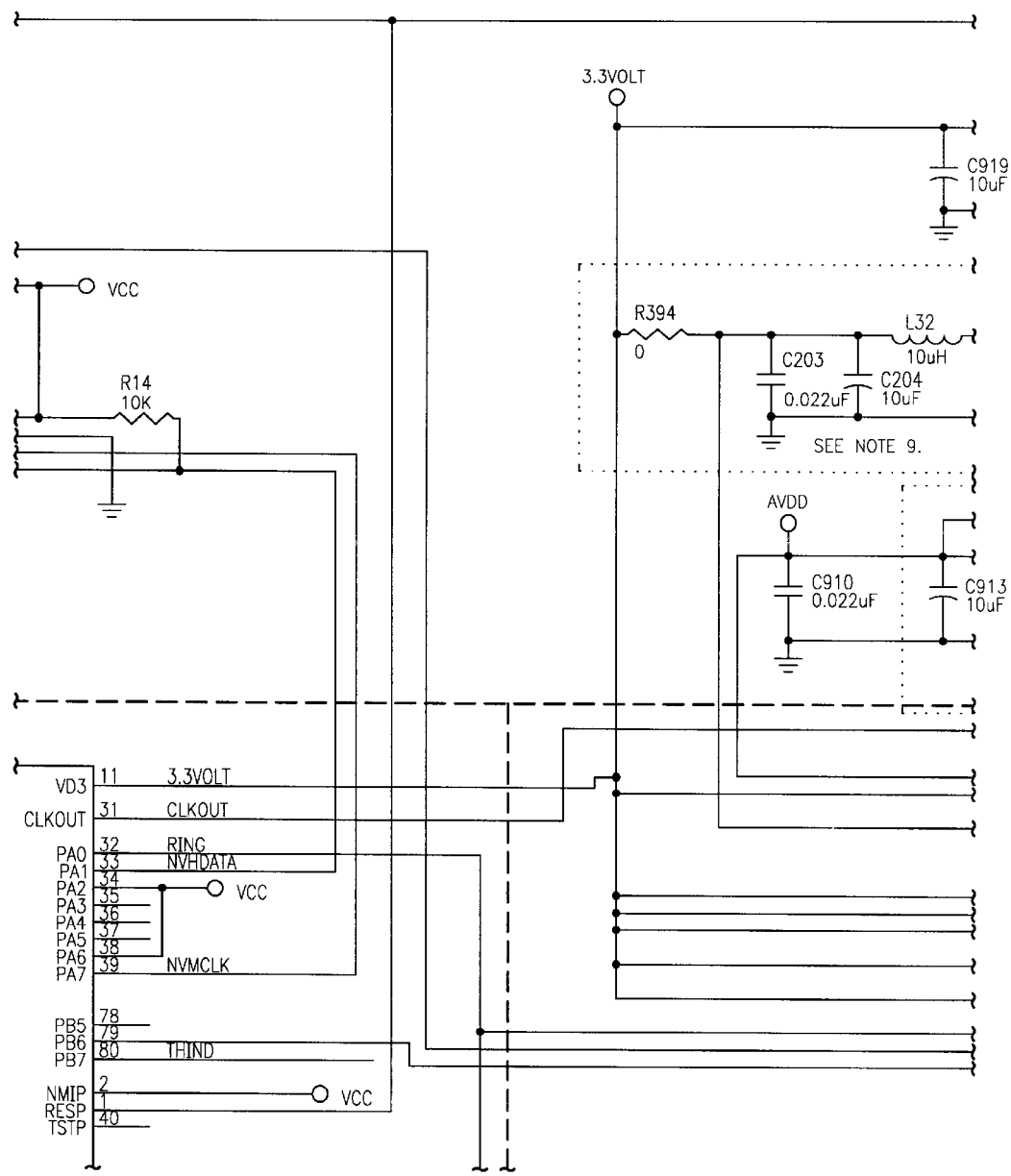
Figure 5C:
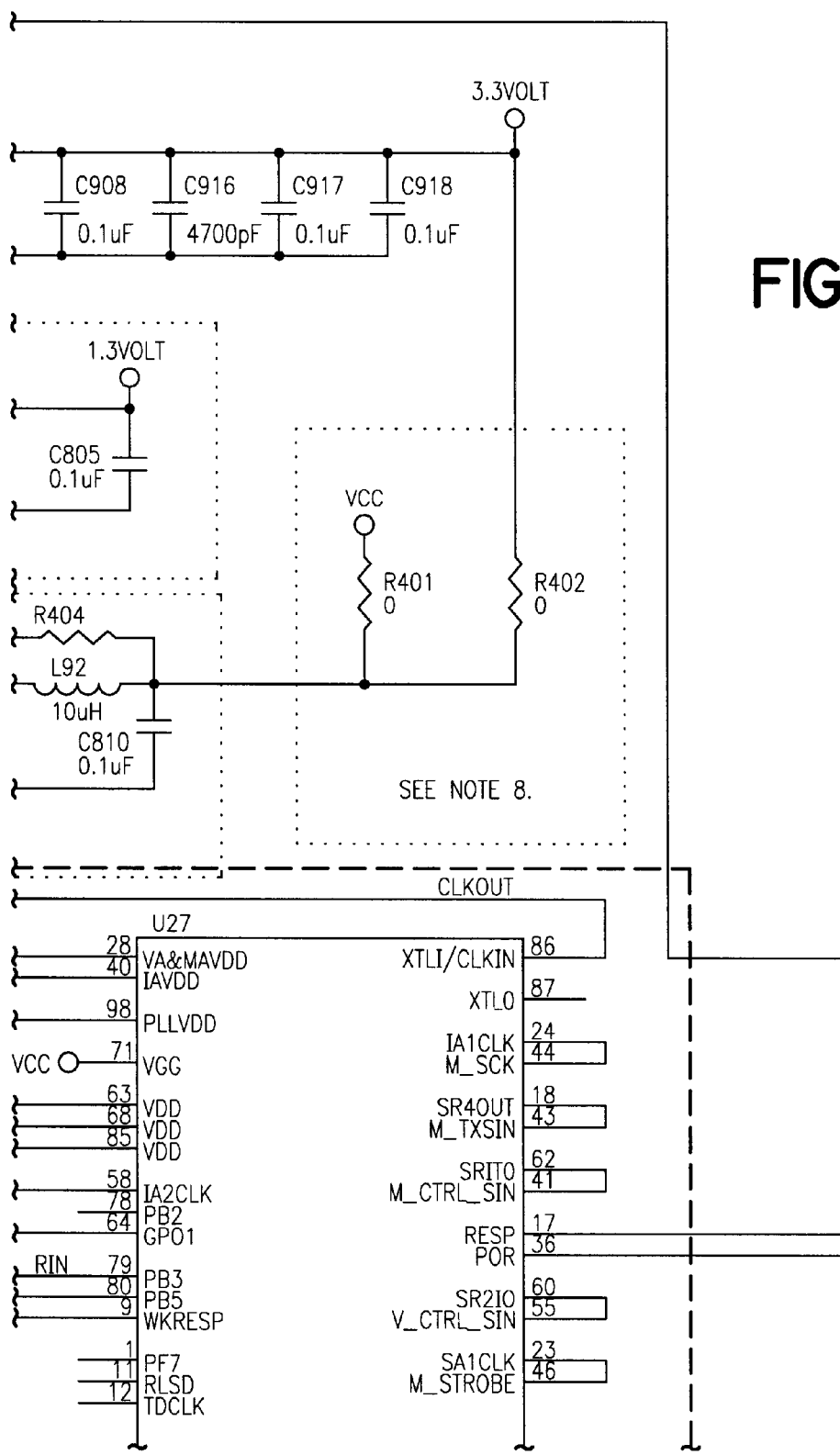
Figure 5D:
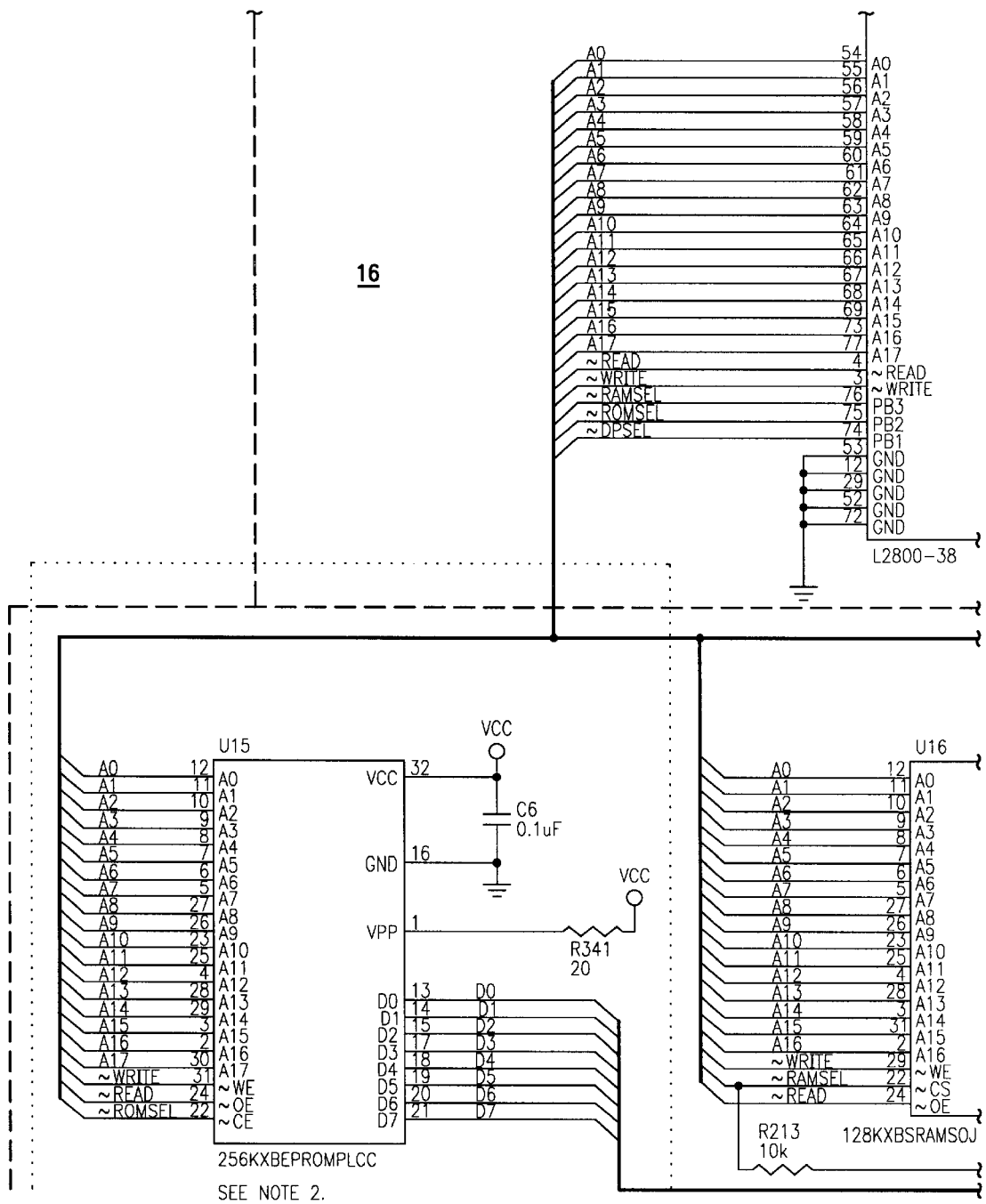
Figure 5E:
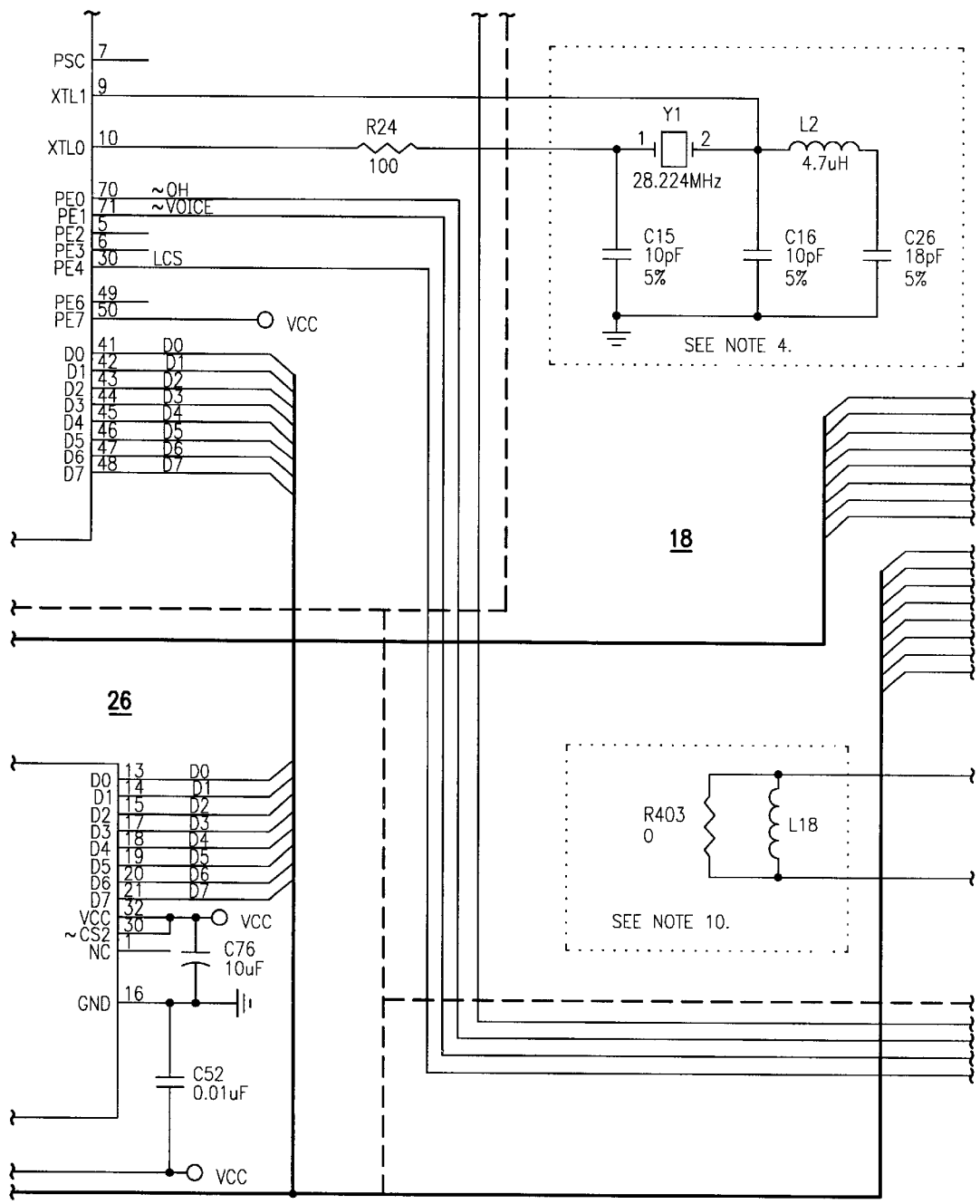
Figure 5F:
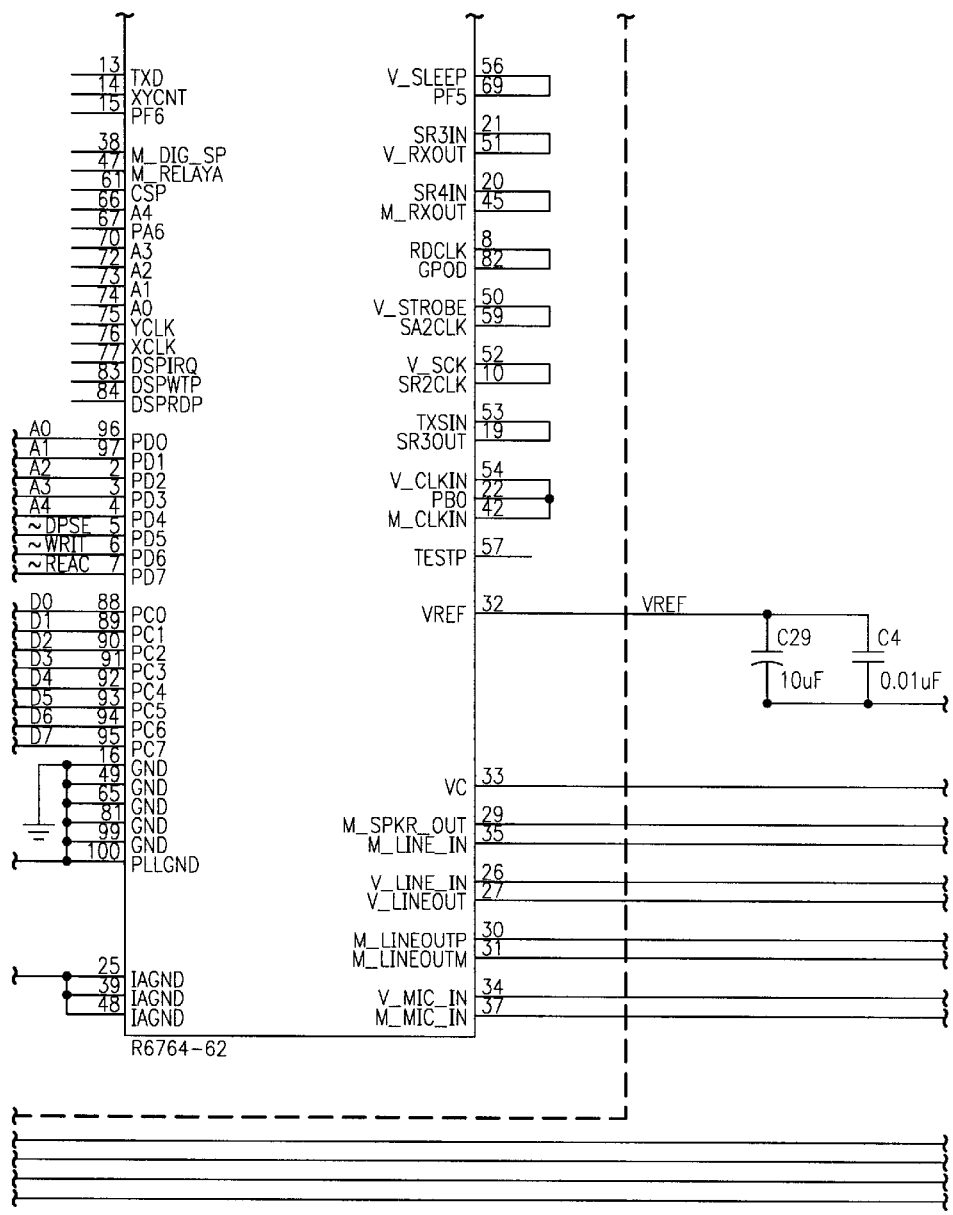
Figure 5G:
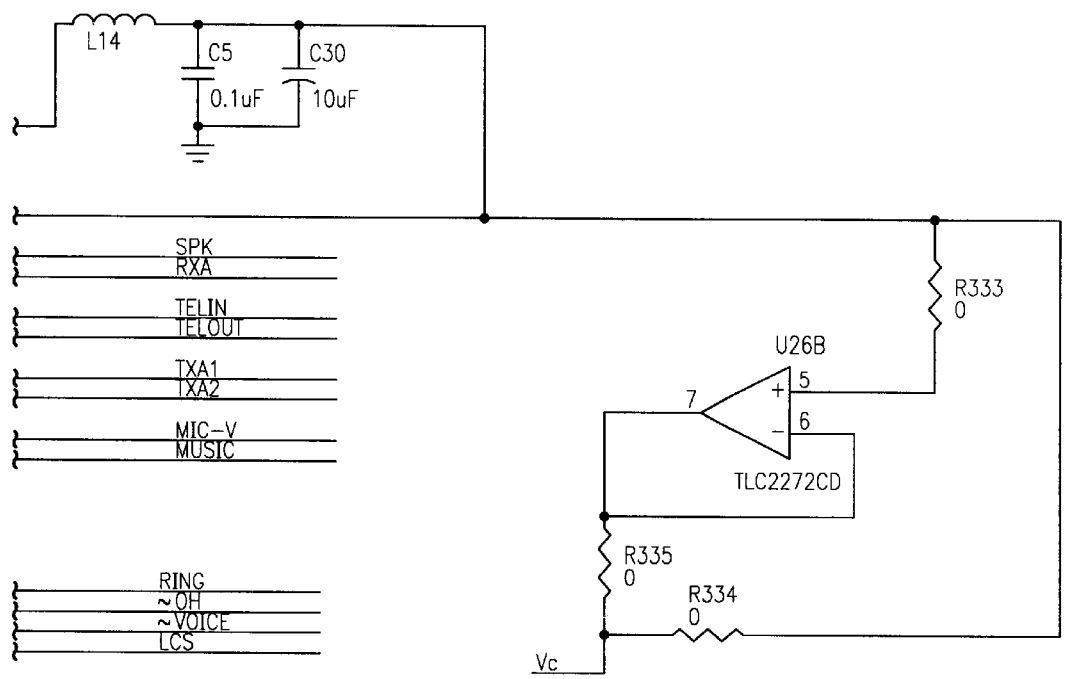

Details of the circuits corresponding to the block diagram of FIG. 4 are shown in FIGS. 4–7.

FIG. 4 shows details of the interface 14 between the computer 12 and modem 10 A,B Also shown is a stand alone LED display 15 and power source 17.

FIG. 5 shows the controller 16 with memory 26 and the data processor 18 of the modem 10 of this invention.

Figure 6A:
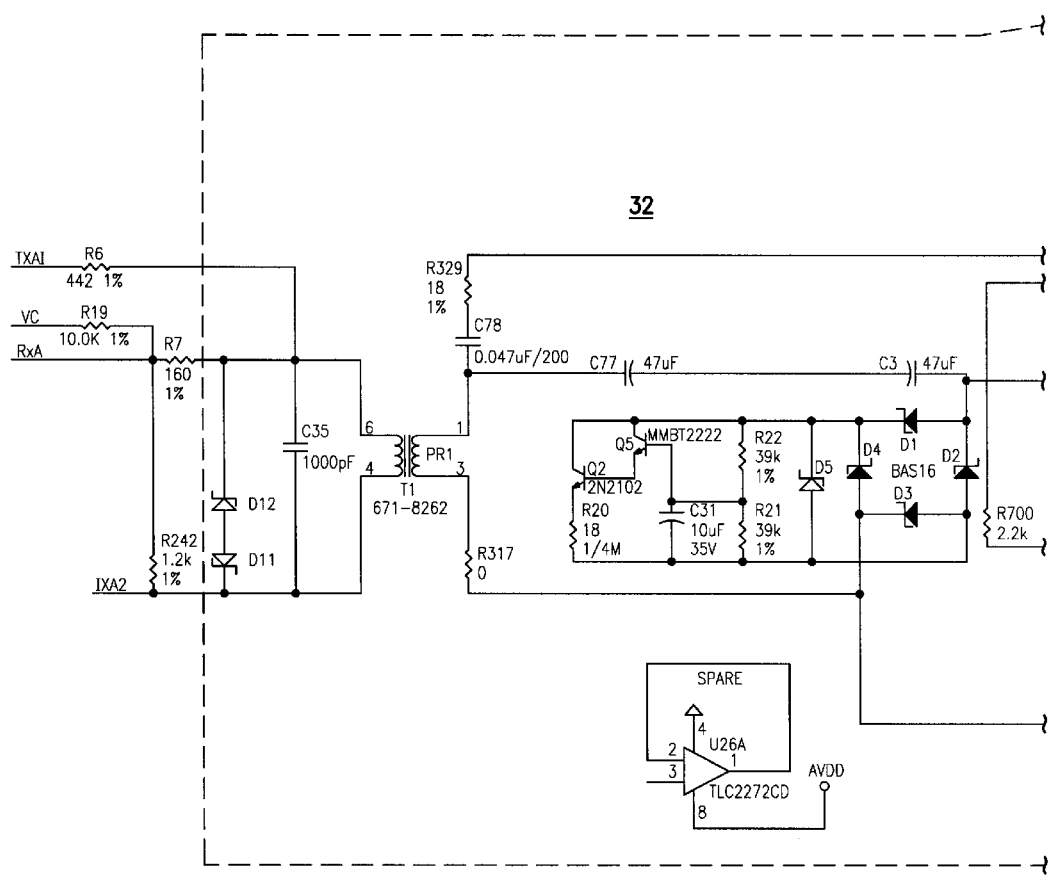
FIG. 6 shows the DAA 32 and the current generator 28 with switch 34.
Figure 6B:
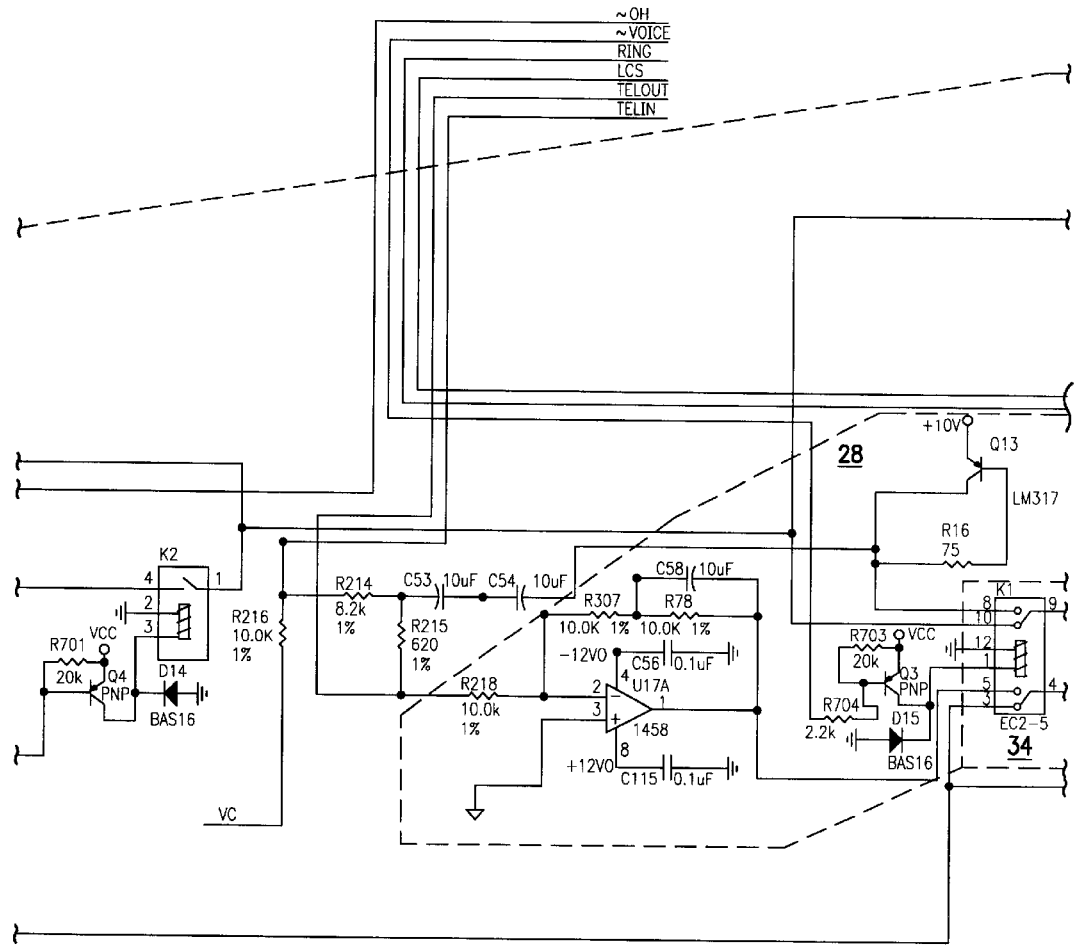
Figure 6C:
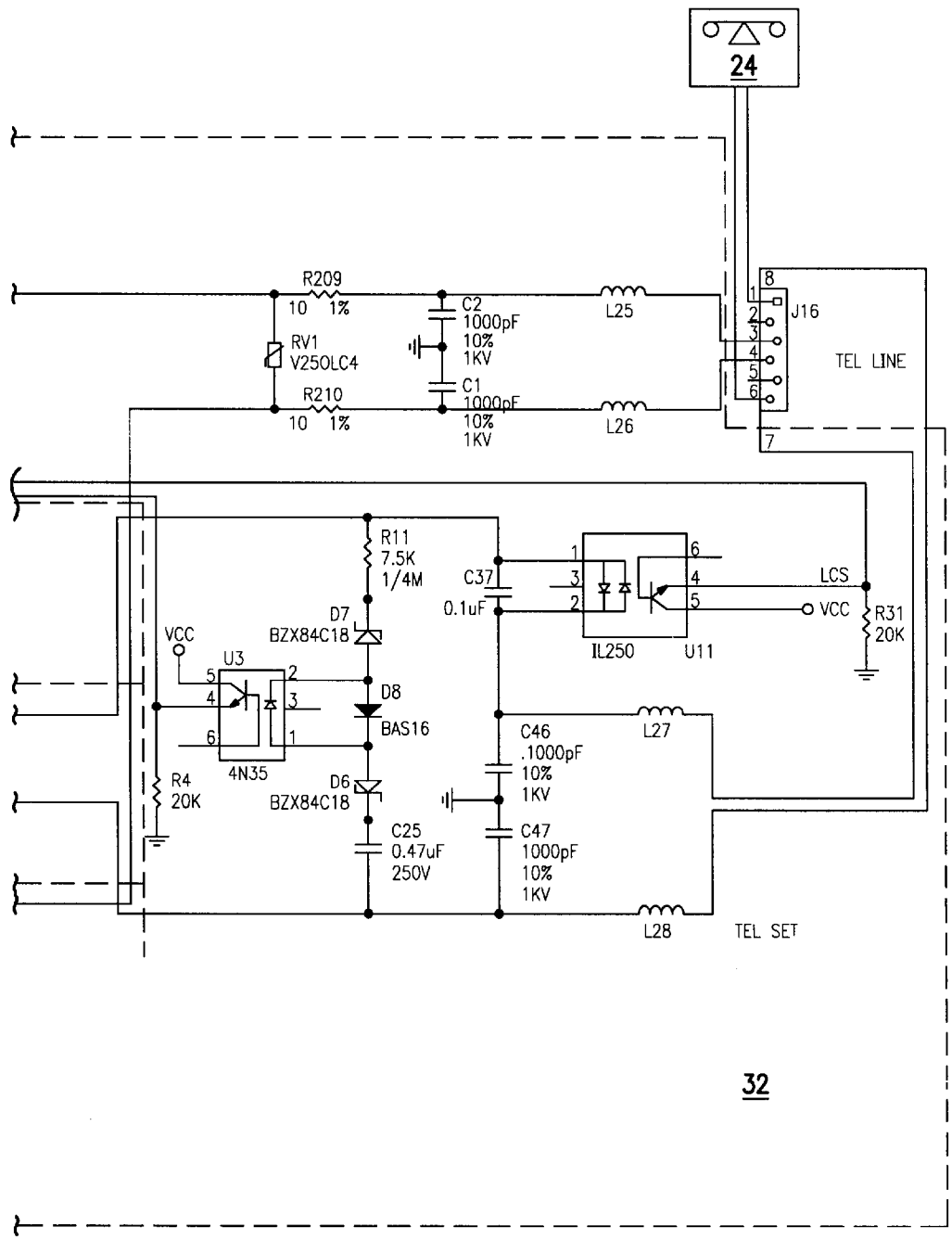

FIG. 6 shows the DAA 32 and the current generator 28 with switch 34.

Figure 7:
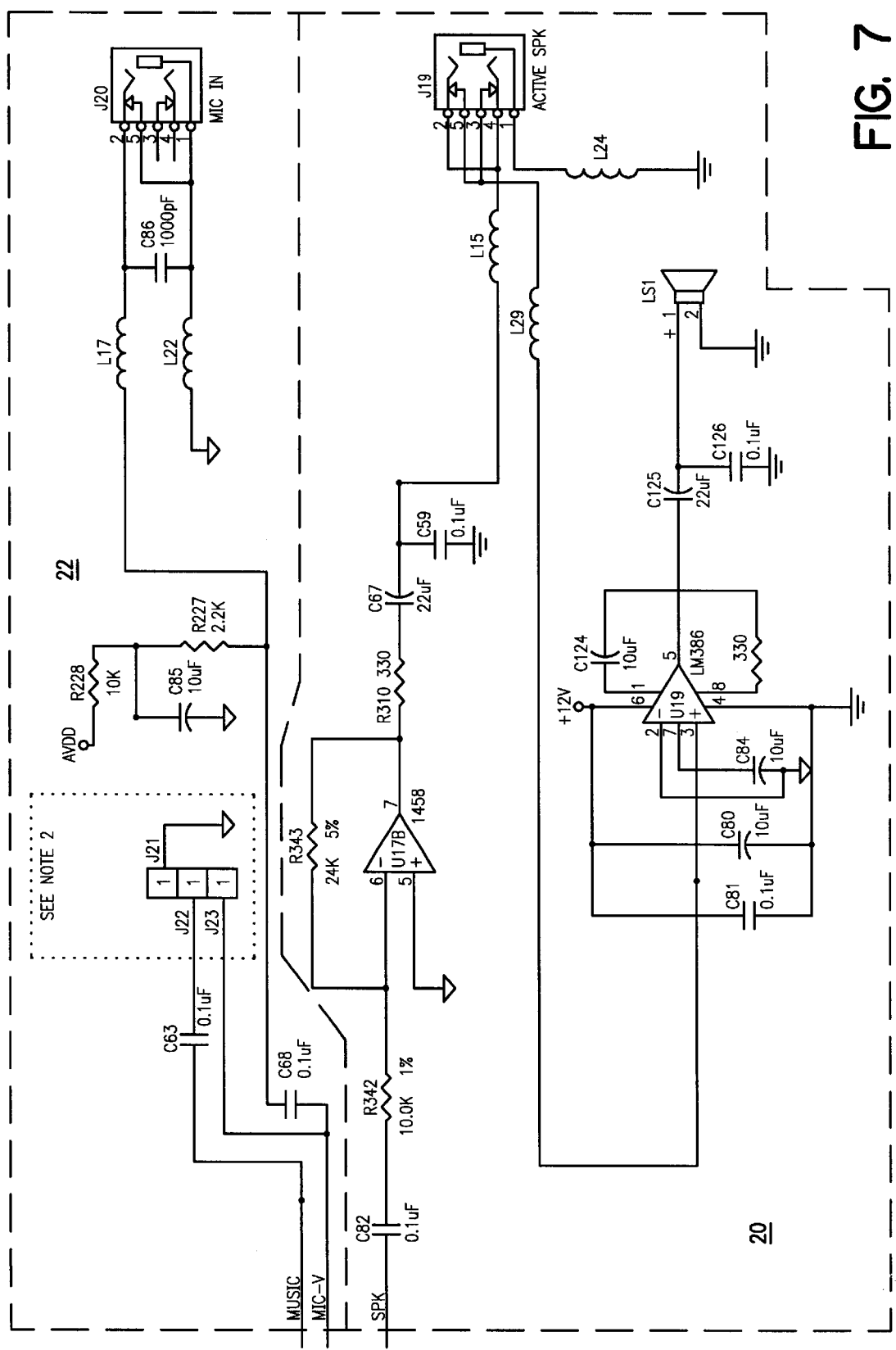
FIG. 7 shows the microphone circuitry 22 and the speaker circuitry 20.

FIG. 7 shows the microphone circuitry 22 and the speaker circuitry 20.

There has been described a system whereby each station of a local area network connected to a central office can communicate more conveniently with one another. In operation, when a signal that alerts one station that another station wishes to communicate is provided. Then the system of this invention eliminates the dial tone from the central station when the two local stations are communicating. This is accomplished by a programmed controller operating a switch which disconnects the DAA connected to the central station and connects a current generator to operate the data processing circuit of the station. In some cases, the current generator is added as a modification to the modem of each station according to the invention. In cases where a current generator is available such as in an answering device that has a current generator to drive a speaker and a microphone, the system uses the existing current generator.

Modifications and variations of this invention may be contemplated after reading the specification and studying the drawings which are within the scope of the invention. I therefore wish to define the cope of my invention by the appended claims.

I claim:

1. A modem which comprises:

a central processor having a memory means for storing commands;

a data processor controlled by said commands and adapted to communicate with a telephone;

a data access arrangement circuit adapted for connection to a central telephone office;

a switch means for directing current to said data processor which in one position is adapted to direct current from a current generator and in another position is adapted to direct current from said central telephone office through said data access arrangement circuit to said data processor;

a capacitor having one terminal connected to a terminal of said switch connected to said data processor and another terminal connected to a terminal of said switch connected to said data access arrangement circuit.

2. The modem of claim 1 wherein wherein said data processor is adapted to communicate with at least one of a speaker, a microphone.

3. The modem of claim 1 wherein said central processor is interfaceable with a computer.

4. The modem of claim 1 which further comprises:

a current generator;

said current generator being connected to said data processor when said switch means is in said first position, from said office.

5. A modem which comprises:

an interface means adapted for connecting said modem to a computer;

a central processor connected to said interface providing that said central processor is interfaceable with said computer;

a memory means communicating with said central processor;

a data processor adapted to communicate with a speaker and a microphone;

a current generator adapted to provide line current to said data processor;

a telephone communicating with said data processor;

a data access arrangement adapted for connection to a central telephone office;

a switch means for directing current to said data processor which in one position directs current from said current generator to said telephone and in another position directs current from said central telephone office through said data access arrangement to said telephone;

a capacitor having one terminal connected to a terminal of said switch connected to said data processor and another terminal connected to a terminal of said switch connected to said data access arrangement circuit.

6. A method for communication between a first station and a second station, wherein said first and second stations are any stations of a local area network connected to a central office, said method comprising the steps:

(i) dialing from said first station a telephone number, N;

(ii) examining N and when N is for a remote party, then: said first station is connected to draw current from the central office and transmit signal directly to the central office and when N is a call number of a second station, then said first station is disconnected from said central office thereby interrupting line current from central office to station A, interrupting the dial tone;

connecting a first current generator to supply current from the current generator to a data processing unit of said first station;

sending signal N from said first station to said second station by capacitive coupling between the data processors of said first and second stations;

picking up a telephone at said second station in response to a signal received at said second station;

connecting said second station to said central office when said signal is from a remote caller and interrupting line current to said second station from the central office if said signal is a signal is from said first station;

connecting a second current generator to a data processor of said second station providing that communication between said first station and said second station can take place without dial tone.

* * * * *